(12) United States Patent
Suzuki et al.

(10) Patent No.: US 6,530,203 B2
(45) Date of Patent: Mar. 11, 2003

(54) SPROUTING BEANS REFINEMENT APPARATUS

(75) Inventors: Tomosaburo Suzuki, Kanagawa-ken (JP); Ribun Tazaki, Fuchu (JP)

(73) Assignee: Daisey Machinery Co., Ltd., Tsurugashima (JP)

( * ) Notice: Subject to any disclaimer, the term of this patent is extended or adjusted under 35 U.S.C. 154(b) by 0 days.

(21) Appl. No.: 10/028,699

(22) Filed: Dec. 28, 2001

(65) Prior Publication Data

US 2002/0053195 A1 May 9, 2002

Related U.S. Application Data

(63) Continuation of application No. 09/874,985, filed on Jun. 7, 2001, now abandoned, which is a continuation of application No. 09/257,197, filed on Feb. 25, 1999, now abandoned.

(30) Foreign Application Priority Data

May 15, 1998 (JP) ............................................. 10-133329

(51) Int. Cl.⁷ .............................................. A01D 45/00
(52) U.S. Cl. ...................................... 56/327.2; 209/308
(58) Field of Search ................................. 209/691, 692, 209/693, 45, 46, 47, 49, 308; 198/499; 47/61; 56/327.1, 327.2; 460/96

(56) References Cited

U.S. PATENT DOCUMENTS

| | | | |
|---|---|---|---|
| 2,228,977 A | * | 1/1941 | Rogers ....................... 209/44.2 |
| 2,714,953 A | * | 8/1955 | Wolski ....................... 209/44.1 |
| 3,642,133 A | | 2/1972 | Venanzetti |
| 3,666,091 A | | 5/1972 | Ludlum |
| 3,687,062 A | | 8/1972 | Frank |
| 4,076,124 A | | 2/1978 | Taysom et al. |
| 4,078,663 A | | 3/1978 | Barker et al. |
| 4,146,483 A | | 3/1979 | Lee |
| 4,267,930 A | * | 5/1981 | Melkonian et al. ........... 209/3.1 |
| 4,289,614 A | * | 9/1981 | Suzuki ....................... 209/308 |
| 4,633,999 A | | 1/1987 | Perneczky |
| 4,760,925 A | * | 8/1988 | Stehle et al. ................. 209/616 |
| 5,042,195 A | | 8/1991 | Lee et al. |
| 5,213,197 A | | 5/1993 | Mohri |
| 5,333,738 A | | 8/1994 | Fuchs et al. |

FOREIGN PATENT DOCUMENTS

| | | | | |
|---|---|---|---|---|
| DE | 4235888 | * | 4/1995 | ............. B07C/5/34 |
| JP | 54-025752 | | 3/1979 | |
| JP | 54-025753 | | 3/1979 | |
| JP | 19790025753 | | 3/1979 | |
| JP | 19790025754 | | 3/1979 | |
| JP | 55-118383 | | 9/1980 | |
| JP | 55-118384 | | 9/1980 | |
| JP | 55-118385 | | 9/1980 | |
| JP | 408131145 | * | 5/1996 | .......... A23N/15/00 |

* cited by examiner

*Primary Examiner*—Thomas B. Will
*Assistant Examiner*—Árpád F Kovács
(74) *Attorney, Agent, or Firm*—Oblon, Spivak, McClelland, Maier & Neustadt, P.C.

(57) ABSTRACT

A sprouting beans refining apparatus wherein refuse matters of hulls, trash, small roots, etc. are removed from sprouting beans efficiently. Sprouting beans raked up by a raking-up conveyor are caused to fall down on an endless flat belt which is supported by a vibration frame inclined upwardly toward a moving direction. Sprouting beans on the endless flat belt are sent downwardly by vibration of the vibration frame to fall down onto a lower endless flat belt. Refuse matters of roots, trash, etc. contained in the sprouting beans attach to the surface of the endless flat belt and are transferred together with the endless flat belt to be removed by a scraper. Refined sprouting beans are discharged from a lower end of the endless flat belt of a lowermost stage.

5 Claims, 2 Drawing Sheets

SPROUTING BEANS REFINEMENT APPARATUS

CROSS REFERENCE TO RELATED APPLICATIONS

This application is a continuation of Ser. No. 09/874,985 filed Jun. 7, 2001 which is, in turn, a continuation of Ser. No. 09/257,197 filed Feb. 25, 1999. Both now abandoned.

BACKGROUND OF THE INVENTION

1. Field of the Invention

The present invention relates to an apparatus for refining sprouting beans by removing trash, hulls, small roots and the like attached to or mixed in harvested sprouting beans.

2. Description of the Prior Art

In the harvested sprouting beans, there are contained refuse matters of trash or hulls of raw material beans, small or slender roots and the like in approximately 10% by weight. In order to remove these refuse matters of the harvested sprouting beans, there has been used in the prior art an apparatus in which the sprouting beans are immersed in a water tank filled with a large amount of water so that the refuse matters of hulls, trash or the like are settled for removal.

In the prior art apparatus, however, not only a large amount of water is needed but also there is needed a large space for placing a large water tank in a factory. Still larger problems exist such that there occur breaks of the sprouting beans in a washing device as well as the sprouting beans, while in the water, absorb water excessively so that their freshness preservation is compromised greatly.

Thus, the applicant here has heretofore disclosed a sprouting beans refining apparatus wherein, while sprouting beans are placed on a perforated endless belt to be conveyed thereon, said endless belt is vibrated so that refuse matters of hulls, trash and the like are removed from the sprouting beans without water being used (Japanese Patent Application No. Sho 54-25752). This apparatus has been very effective but it has been still insufficient in some aspect in removing the refuse matters completely from the sprouting beans.

SUMMARY OF THE INVENTION

In order to solve the problems in the prior art apparatus, it is an object of the present invention to provide a sprouting beans refining apparatus constructed in a completely different way from the prior art so as to be able to remove refuse matters from sprouting beans cleanly to a satisfactory extent, wherein not only there is used no water tank but also there is occupied a small space only.

In order to attain said object, the present invention provides a sprouting beans refining apparatus having a vibration frame for supporting an endless flat belt, of which surface is easily wettable by water, inclined so as to make a moving direction thereof upward; a drive unit for driving said endless flat belt toward said moving direction; a vibration generator for giving said frame vibration in a reverse direction of said moving direction of the endless flat belt so that sprouting beans on said endless flat belt are sent toward said reverse direction of the moving direction of the belt; and a scraper disposed opposingly to said endless flat belt for removing attachments to said belt.

The endless flat belt employed in the present invention is preferably a nonperforated endless flat belt but a perforated belt may be also used. Further, the endless flat belt may be used in one stage only but it is preferable to make a construction such that the endless flat belts are arranged in plural stages of two or more in series for obtaining an enhanced refining function. In this case, it will be effective for economy of space if the construction is made such that the endless flat belts are arranged in series in two or more stages in a state of upward and downward directional lamination.

The sprouting beans refining apparatus according to the present invention is constructed as mentioned above, thereby the sprouting beans supplied onto the endless flat belt are given vibration in the reverse direction of the moving direction of the endless flat belt so as to be sent thereon gradually downwardly along the inclination of the endless flat belt. At this time, due to repetition of springing and progressing on the belt, the sprouting beans may be broken off from their portions of small or slender roots. The roots so broken off or other refuse matters attached to or mixed in the sprouting beans stick to the upper surface of the endless flat belt which is wetted by water on its surface and are transferred upwardly together with movement of the endless flat belt in the reverse direction of the sprouting beans.

The refuse matters attaching to the wetted surface of the endless flat belt and transferred upwardly together with the endless flat belt are scraped off to be discharged by the scraper disposed opposingly to the endless flat belt for removing the attachments to said belt.

The sprouting beans which have come to the lower end of the endless flat belt are collected as final products as they are or are supplied onto the endless flat belt of the next stage to be refined likewise for cleaner sprouting beans.

In the apparatus having plural stages of the endless flat belts, said refining operation of the sprouting beans is repeated at each of the stages so as to enhance the degree of the refinement.

BRIEF DESCRIPTION OF THE DRAWINGS

FIG. 2 shows a link structure for supporting a vibration frame vibratorily, wherein FIG. 2(a) is a side view thereof and FIG. 2(b) is a cross sectional view taken on line B—B of FIG. 2(a).

DESCRIPTION OF THE PREFERRED EMBODIMENTS

Figure 1:
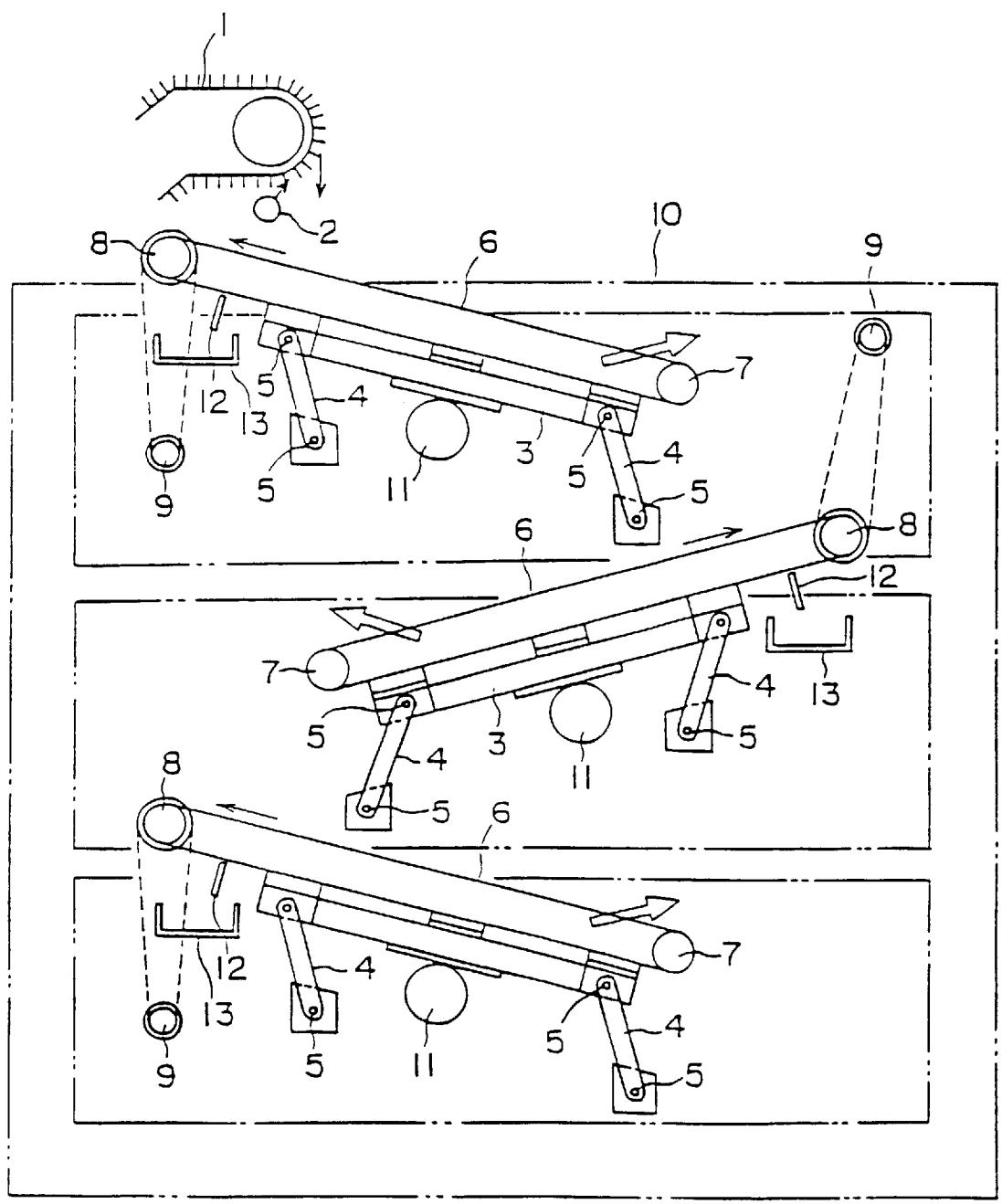
FIG. 1 is a side view showing construction of a sprouting beans refining apparatus of an embodiment according to the present invention.

Herebelow, description will be made concretely on a sprouting beans refining apparatus of an embodiment according to the present invention with reference to FIG. 1. FIG. 1 is an entire constructional side view of a sprouting beans refining apparatus according to the present invention. In FIG. 1, a raking-up conveyor 1 rakes up sprouting beans from a sprouting beans storage tank (not shown) provided below the raking-up conveyor 1. The raking-up conveyor 1 comprises an endless flat belt on which needle-like projections are planted. An air blowing device 2 blows air in order to separate the sprouting beans attached to the needle-like projections of the raking-up conveyor 1. Below the raking-up conveyor 1, there is provided a vibration frame 3 which is supported pivotably around a fulcrum 5 by a link 4.

Figure 2:
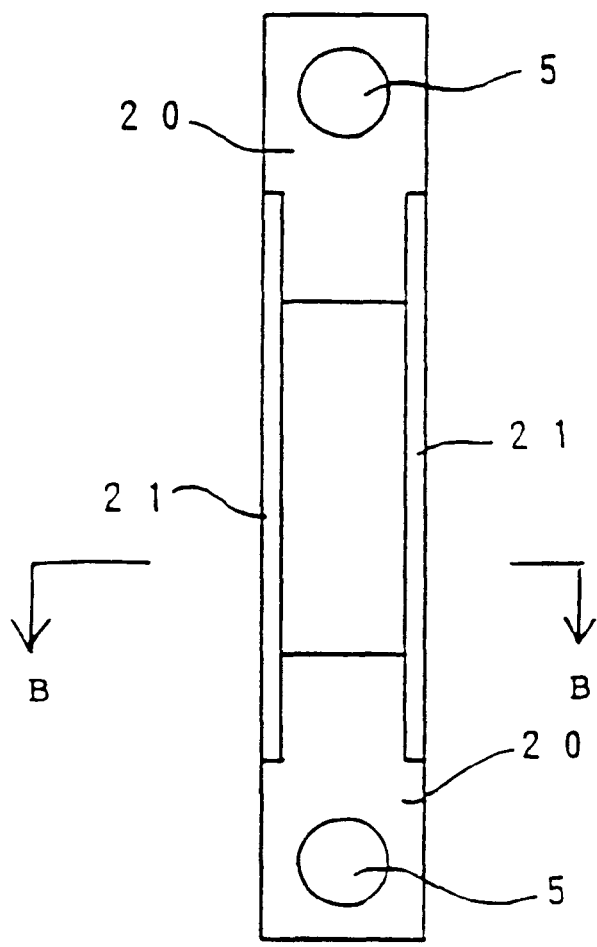
Figure 2:
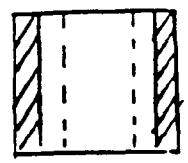

FIG. 2 shows a link structure for supporting the vibration frame vibratorily, wherein FIG. 2(a) is a side view thereof and FIG. 2(b) is a cross sectional view taken on line B—B of FIG. 2(a). As shown in FIGS. 2(a) and 2(b), the link is an elastic or flexible member constructed such that two plate springs 21 have a holder 20 at one end thereof and another holder 20 at the other end thereof and these two holders 20 are supported by the fulcrums 5, respectively. The vibration frame 3 is arranged inclinedly about 10 degrees downwardly on the right hand side in FIG. 1.

Two rolls 7, 8 are supported rotatably on the vibration frame 3 and a rubber-make endless flat belt 6 is wound around therebetween. The roll 8 is driven rotationally by a drive motor 9 to move the endless flat belt 6 upwardly along the inclination as shown by an arrow in FIG. 1.

Below the vibration frame 3, there is provided a vibration generator 11 for vibrating the vibration frame 3. This vibration generator 11 can give vibration, for example, of a frequency of 1,000 to 2,000 per minute. The vibration frame 3 is supported pivotably around the fulcrum 5 by the link 4, hence the vibration frame 3 given vibration by the vibration generator 11 moves vibratorily toward a reverse direction of a moving direction of the endless flat belt 6, as shown by a white arrow in FIG. 1. Thus, the sprouting beans on the endless flat belt 6 are sent downwardly in the reverse direction of the moving direction of the endless flat belt 6.

On the other hand, roots of the sprouting beans or other refuse matters attached to or mixed in the sprouting beans stick to an upper surface of the endless flat belt 6 having a surface wetted by water and are transferred together with the movement of the endless flat belt 6 upwardly in the reverse direction of the moving direction of the sprouting beans.

On a returning side of the endless flat belt 6, there is disposed a refuse scraper 12 in engagement with the surface of the endless flat belt 6, and below the refuse scraper 12, there is disposed a tray 13 for receiving refuse scraped off the endless flat belt 6 by the refuse scraper 12.

As shown in FIG. 1, below the vibration frame 3 described above, there are provided further vibration frames 3, in two stages, each stage having the same structure as that described above including the endless flat belt 6, the vibration generator 11, etc. and being supported pivotably around the fulcrum 5 by the link 4. All of these vibration frames 3 are supported by a frame 10 but detailed illustration of the structure thereof is omitted for easily understandable simplicity of FIG. 1.

It is to be noted that, although the vibration frames 3 are provided in three stages in the illustration, the vibration frames 3 may be provided in two stages or even in four or more stages for better refining, as the case may be. Also, in place of the vibration generator 11 of a rotary type which is used for vibrating the vibration frames 3 in the illustration, a vibration generator of an eccentric cam type or a piston crank type, or a mechanism for throwing up inclinedly the sprouting beans using a spring and lever, as disclosed in the Japanese Patent Application No. Sho 54-25753, may be employed.

According to the apparatus as described above, the sprouting beans can be refined in the following way.

The sprouting beans to be refined are raked up by the raking-up conveyor 1 from a storage tank (not shown) while they are disentangled of lumps of sprouting beans and then are caused to fall down on the endless flat belt 6 above the vibration frame 3.

The vibration frame 3 is given vibration by the vibration generator 11, hence, as mentioned above, the sprouting beans springing on the endless flat belt 6 are moved gradually downwardly along the inclination of the endless flat belt 6.

On the other hand, refuse matters of roots, hulls, trash and the like contained in the sprouting beans are transferred upwardly together with the endless flat belt 6 as they attach to the surface of the endless flat belt 6 and then are scraped by the refuse scraper 12 to be discharged into the tray 13.

The sprouting beans so refined are caused to fall down on the endless flat belt 6 of the lower stage from the right hand end in FIG. 1 of the endless flat belt 6 to be further refined with the refuse matters still remaining in the sprouting beans being removed and then are taken out as clean sprouting beans. Further refinement may be made, as the case may be, with the endless flat belt 6 of the further lower stage being used.

In the above explanation, the present invention has been described concretely with respect to the embodiment illustrated in FIG. 1 but the present invention is not limited thereto and, needless to mention, may be enhanced with various modifications thereof. For example, although the inclination of the endless flat belt 6 has been described as about 10 degrees in the embodiment, said inclination may be set in an appropriately selected angle according to the types and shapes of the sprouting beans to be processed.

Also, although the vibration frames 3 are disposed zigzag in the form of upward and downward directional lamination in the embodiment, the vibration frames 3 may be arranged in series laterally if space therefor is available laterally.

As mentioned above, according to the sprouting beans refining apparatus of the present invention, the sprouting beans can be refined without using water which diminishes freshness preservation of the sprouting beans.

Especially, the apparatus of the present invention is constructed uniquely such that the endless flat belt 6 is supported by the vibration frame 3 so as to be inclined upwardly in the moving direction thereof and roots, trash and the like attaching to the surface of the endless flat belt 6 are transferred upwardly together with the endless flat belt 6, while the sprouting beans on the endless flat belt 6 are given vibration so as to be sent downwardly, thereby such a highly efficient refinement of the sprouting beans as has been never seen in the prior art is realized.

What is claimed is:

1. A sprouting beans refining apparatus comprising:
   a raking conveyor configured to deliver sprouting beans;
   a plurality of vibration frames configured to receive the sprouting beans from the raking conveyor and disposed zigzag in a downwardly inclined direction;
   an endless flat belt being supported on a first one of the plurality of vibration frames;
   a drive unit configured to move the belt in an upwardly inclined direction around the first one of the plurality of vibration frames;
   a vibration generator configured to vibrate the first one of the plurality of vibration frames so that the sprouting beans are sent in a downwardly inclined direction opposite to a direction of movement of the belt;
   a scraper disposed underneath and opposed to the belt so that attachments to the belt are removed therefrom;
   a stationary frame configured to support the plurality of vibration frames;
   a link configured to connect the first one of the plurality of vibration frames to the stationary frame; and a pair of fulcrums connected to opposite ends of the link and configured to allow the link to pivot the first one of the plurality of vibration frames with respect to the stationary frame;

wherein said link is one of an elastic and a flexible member having a pair of plate springs with one holder at one end thereof and one other holder at an opposite end thereof.

2. A sprouting beans refining apparatus, according to claim 1, wherein said one holder is supported by and completely surrounds one of the pair of fulcrums and the other holder is supported by and completely surrounds another of the pair of fulcrums.

3. A sprouting beans refining apparatus, according to claim 1, further comprising:

an air blowing device positioned beneath the raking conveyor and arranged to blow the sprouting beans off an underside of the raking conveyor.

4. A sprouting beans refining apparatus, according to claim 1, further comprising:

a pair of rolls positioned at opposite ends of the first one of the plurality of vibration frames and configured to be rotated by the drive unit so that the belt is moved around the pair of rolls.

5. A sprouting beans refining apparatus, according to claim 1, further comprising:

a tray positioned below the scraper and configured to receive attachments removed from the belt.

* * * * *